United States Patent
Lu et al.

(10) Patent No.: US 7,513,473 B2
(45) Date of Patent: Apr. 7, 2009

(54) ANCHOR STRUCTURE FOR ELECTRONIC DEVICES

(75) Inventors: Kun-Yen Lu, Taipei (TW); Rui-Lin Wang, Taipei (TW)

(73) Assignee: Kinpo Electronics, Inc., Taipei (TW)

( * ) Notice: Subject to any disclaimer, the term of this patent is extended or adjusted under 35 U.S.C. 154(b) by 263 days.

(21) Appl. No.: 11/554,875

(22) Filed: Oct. 31, 2006

(65) Prior Publication Data

US 2008/0121772 A1    May 29, 2008

(51) Int. Cl.
*E04G 3/00* (2006.01)
(52) U.S. Cl. ............ 248/276.1; 248/917; 248/921
(58) Field of Classification Search ......... 248/917–923, 248/222.13, 274.1, 282.1, 284.1; 403/53, 403/109.5, 111, 119, 117, 159
See application file for complete search history.

(56) References Cited

U.S. PATENT DOCUMENTS

| | | | | |
|---|---|---|---|---|
| 6,769,657 B1* | 8/2004 | Huang | ...................... | 248/278.1 |
| 7,289,315 B2* | 10/2007 | Hillman et al. | .............. | 361/683 |
| 2007/0102607 A1* | 5/2007 | Koh | ........................ | 248/276.1 |

* cited by examiner

*Primary Examiner*—Amy J. Sterling
(74) *Attorney, Agent, or Firm*—Muncy, Geissler, Olds & Lowe, PLLC

(57) ABSTRACT

An anchor structure for electronic devices includes a plurality of bars that are pivotally coupled through a hinged means. At least one of the bars has a housing space formed in a portion of the interior to allow the bars to be swivelable relative to one another. The anchor structure further has a fastening means which has a handle with a bottom end located in the housing space and hinged on a corresponding bar. The hinged portion on the bottom end of the handle runs through the bar and is fastened to a cam. The housing space also holds a slidable brake element corresponding to the cam and a spring to keep the brake element in contact tightly with the cam so that turning of the cam can selectively move the brake element to a position to escape the axle or to another position to form a tight contact with an axle.

8 Claims, 5 Drawing Sheets

ANCHOR STRUCTURE FOR ELECTRONIC DEVICES

BACKGROUND OF THE INVENTION

1. Field of the Invention

The present invention relates to an anchor structure for electronic devices and particularly to an anchor structure that has a hinge means and a fastening means to adjust holding positions of an electronic device.

2. Description of the Prior Art

Conventional portable electronic devices such as handsets (mobile phones), PDAs, GPS (global positioning system) and the like can provide powerful communication functions, thus are widely accepted on the market. These portable electronic devices are often being installed on transportation vehicles to enable users to use during driving or riding.

In general, the conventional anchor structures, which are used to hold portable electronic devices, include a transformative bar structure or a plurality of hinged bars. Through a turning and fastening mechanism, the coupling tightness of the hinged axles can be altered, and the bars can be swiveled relative to one another about the axles or fastened, thereby to adjust the holding position to provide an optimal operating position for users. However, the stability and rigidity of the transformative bar structure are often not desirable. Swaying frequently occurs during driving. Moreover, the turning and fastening mechanism for the bars is easily loosened. It also is not convenient to use during driving and could result in hazardous conditions. There is still room for improvement.

SUMMARY OF THE INVENTION

In view of the aforesaid problems occurred to the conventional anchor structures for electronic devices, the primary object of the present invention is to provide an anchor structure to hold portable electronic devices.

Another object of the invention is to provide an anchor structure for electronic devices that has a hinge means and a fastening means. There are bars coupled through hinge axles that can be swiveled relative to one another or fastened to adjust the positions of the bars.

Yet another object of the invention is to provide an anchor structure for electronic devices that has a hinge means and a fastening means. The fastening means can simultaneously control swiveling or fastening condition of hinge axles.

To achieve the foregoing objects the anchor structure for electronic devices of the invention includes a plurality of bars that are pivotally coupled through a hinge means. At least one of the bars has a housing space to allow the bars to be swiveled relative to one another. The invention further has a fastening means which has a handle with a bottom corresponding to the housing space and hinged on a corresponding bar. The handle has a hinge portion on the bottom end running through the bar and being fastened to a cam in the housing space. The housing space further holds a slidable brake element corresponding to the cam and a spring to harness the brake element to form a tight contact with the cam. Thus the cam can be turned to selectively make the brake element to slide to a position to escape an axle or another position to form a tight contact with the axle.

The bar that has the housing space has two ends to be pivotally coupled with other bars through the hinge means. The housing space communicates the hinge means on two ends thereof. The housing space also holds one set of brake element and spring corresponding to each hinge means. The cam has two ends pushing a corresponding brake element to control coupling tightness of each hinge means. Hence the positions of bars relative to one another can be adjusted as desired. Moreover, one of the bars has a holding dock to hold an electronic device. Another bar has a base to allow the anchor structure to be mounted onto the surface of a desired object.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
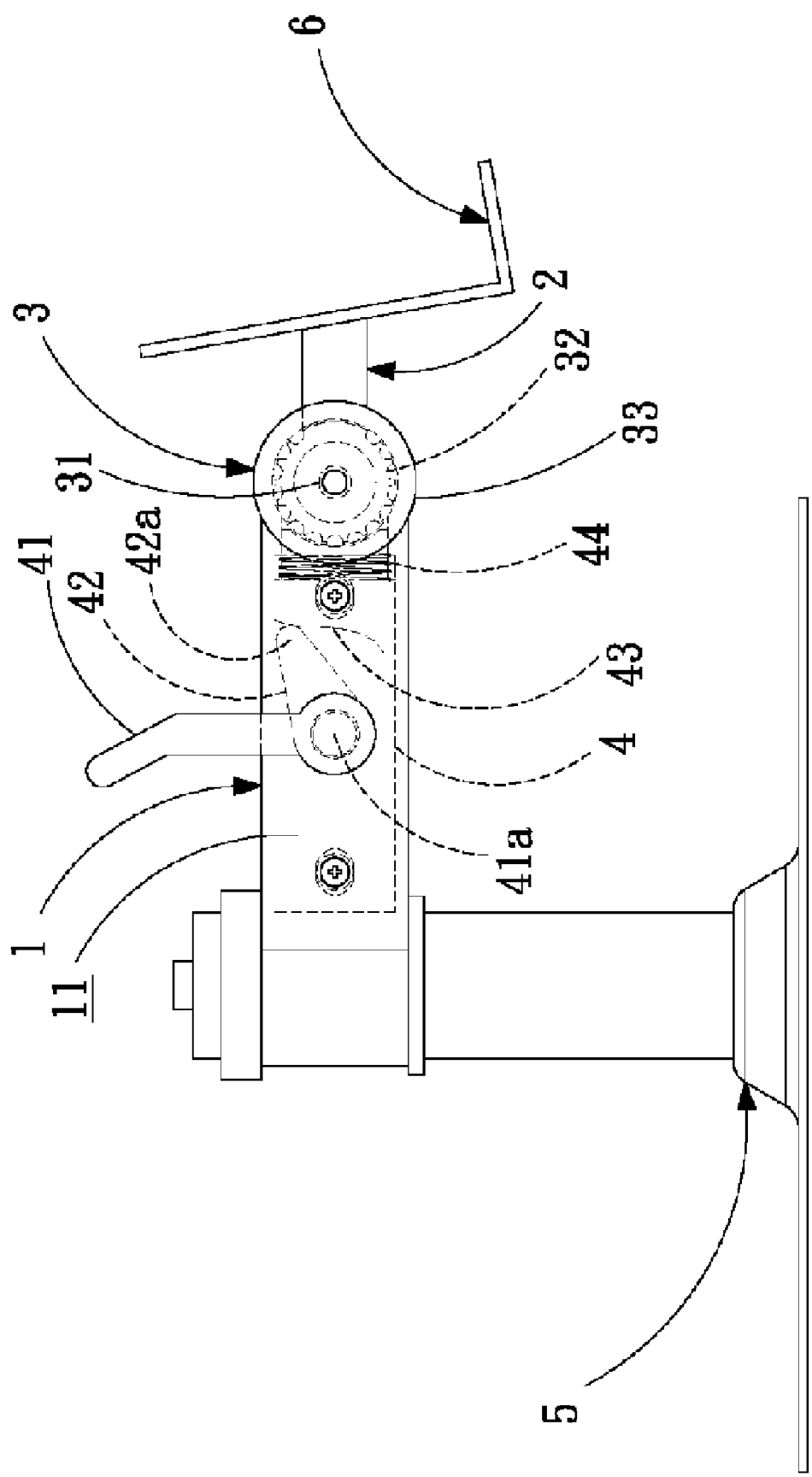
FIG. 1 is a partial sectional and side view of an embodiment of the anchor structure for electronic devices of the invention.
Figure 2:
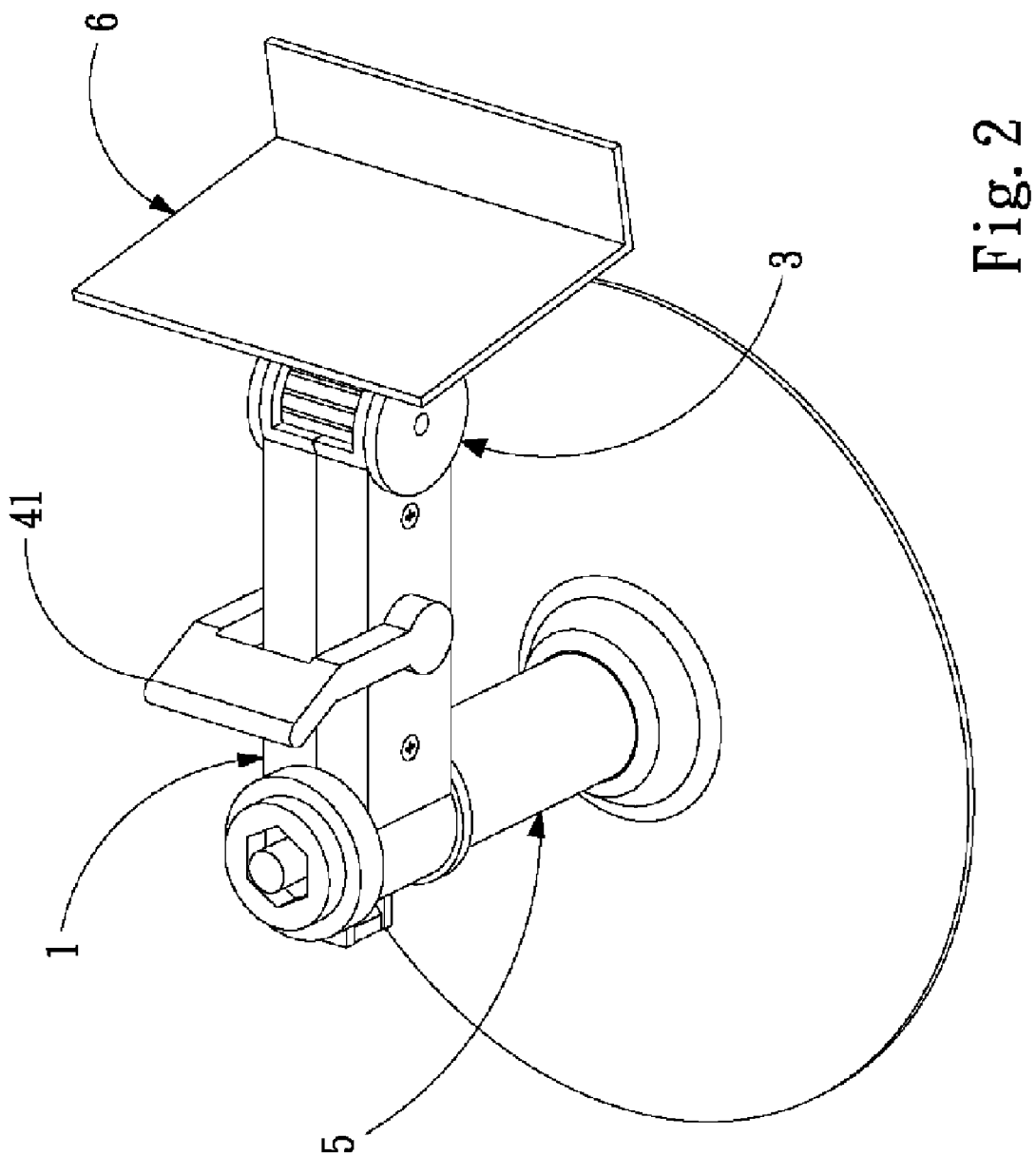
FIG. 2 is a perspective view of the invention according to the embodiment shown in FIG. 1.

Refer to FIGS. 1 and 2 for an embodiment of the anchor structure for electronic devices of the invention. It mainly includes a first bar 1 and a second bar 2 that are pivotally coupled together through a hinge means 3. Through a fastening means 4 the hinge means 3 can be selectively set to a swivelable condition or a non-swivelable condition, and the first bar 1 and the second bar 2 also can be set to a corresponding swivelable condition or a non-swivelable condition.

Figure 3:
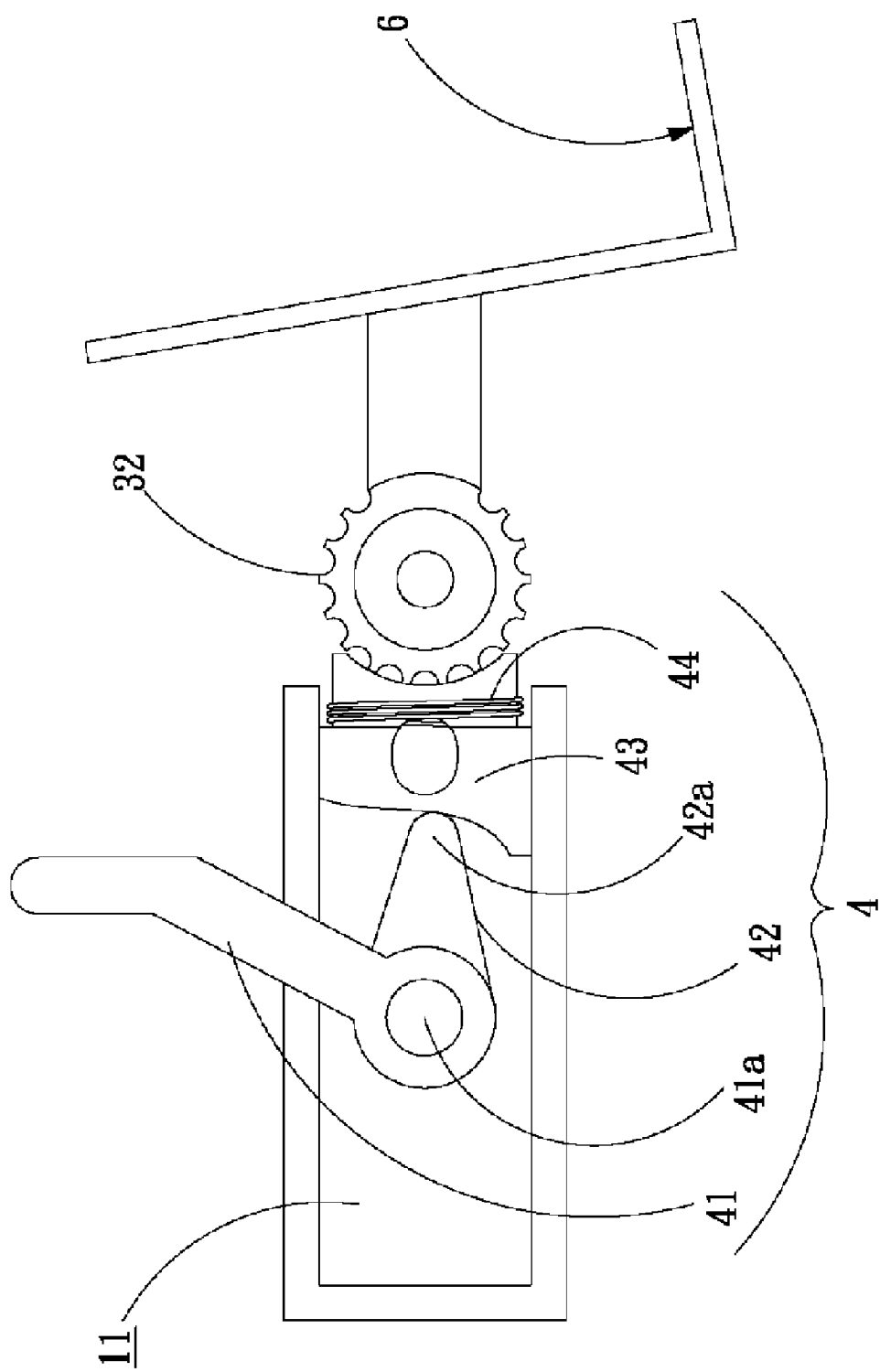
FIG. 3 is a partial enlarged sectional view according to the embodiment shown in FIG. 1.

Referring to FIG. 3, the first bar 1 and the second bar 2 are respectively a rod. The first bar 1 has a housing space 11 formed in a portion of the interior. The hinge means 3 includes an axle 31 hinged on one end of the first bar 1. The second bar 2 is fastened to the peripheral surface of the axle 31 so that the second bar 2 can be swiveled relative to the first bar 1 through the axle 31. The fastening means 4 includes a handle 41 which has a hinge portion 41a on a bottom end corresponding to the housing space 11 and pivotally coupled with the first bar 1. The hinge portion 41a runs through the first bar 1 and fastens to a cam 42 in the housing space 11. The cam 42 has a protrusive portion 42a on one side formed in a selected surface profile. The housing space 11 has one end leading to where the first bar 1 being coupled with the axle 31. The housing space 11 also holds a slidable brake element 43 and fastens to a spring 44 in a fixed manner on the one end. The spring 44 aims to keep the brake element 43 in contact with the cam 42 tightly so that turning of the cam 42 can selectively make the braking element 43 to slide away from the axle 31 or in a tight contact condition with the axle 31 to make the axle 31 in a swivelable condition or non-swivelable condition.

The axle 31 has a teeth structure on the peripheral surface to form a teeth surface 32. The brake element 4 has an end surface made from rubber corresponding to the axle 31 for pressing thereon. Hence the friction force between the brake element 43 and the teeth surface 32 can be increased.

The pivotal coupling portion of the first bar 1 and the axle 31 also has a damping wheel 33 which has a portion of elements fastened to the first bar 1, while other portion of the elements is fastened to the axle 31 so that when the first bar 1 swivels relative to the axle 31 the damping wheel 33 provides a damping resistance. Hence when the brake element 43 loosens the compression on the axle 31, the damping wheel 33 provides resistance against swiveling of the first bar 1 about axle 31 so that the second bar 2 can be firmly anchored on a selected position, and reduce the relative swiveling between the first bar 1 and the second bar 2 caused by gravity force.

The first bar 1 may have a base 5 on other end to mount the anchor structure onto the surface of a selected object. The second bar 2 may have a holding dock 6 on other end to hold the electronic device so that the whole anchor structure can be mounted onto the surface of the selected object.

Figure 4:
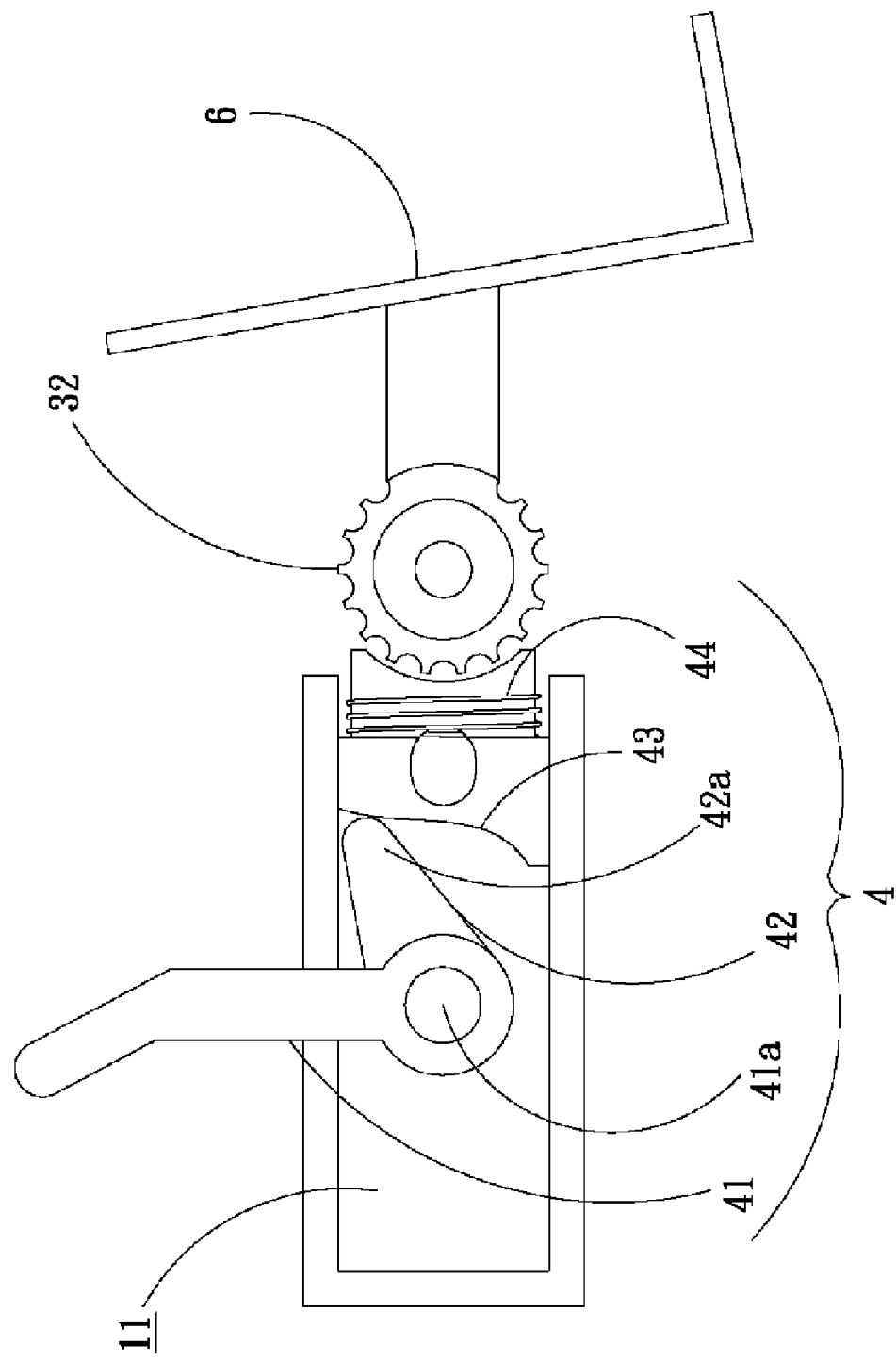
FIG. 4 is a partial enlarged sectional view according to FIG. 3.

Referring to FIGS. 3 and 4, when the handle 41 is moved to a first condition, the cam 42 rams the brake element 43 outwards in contact tightly with the teeth surface 32 of the axle 31 so that the axle 31 is in an anchored condition, and the first bar 1 and the second bar 2 are in the non-swivelable condition relative to each other. When the handle 41 is moved to a second condition, the cam 42 is released from the brake element 43, the brake element 43 is pushed inwards by the spring 44 to escape the teeth surface 32 of the axle 31, hence the first bar 1 and the second bar 2 are in the swivelable condition. But swiveling of the first bar 1 and second bar 2 is resisted by the damping wheel 33 and is proceeded in a slower fashion.

Figure 5:
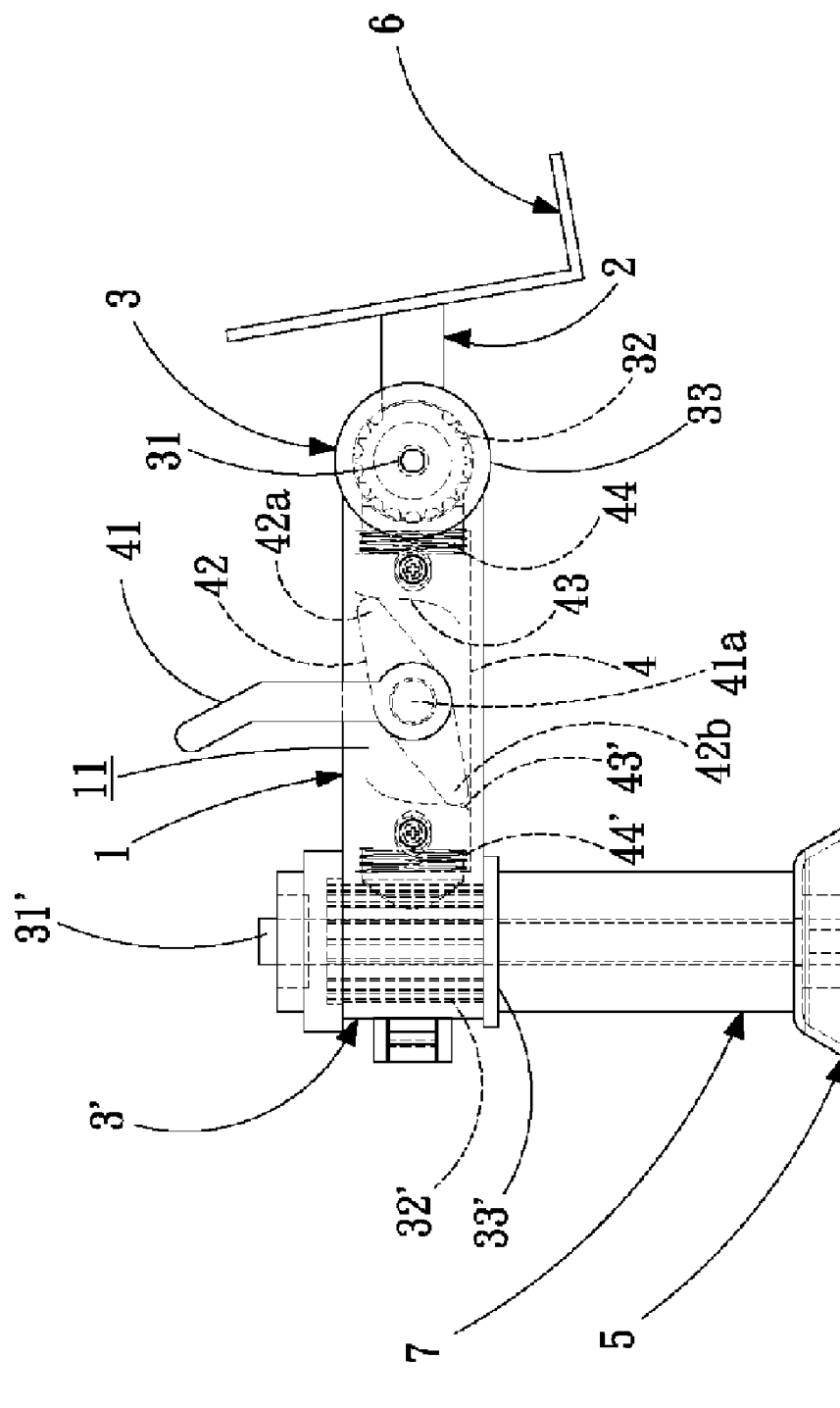
FIG. 5 is a sectional side view of another embodiment of the anchor structure for electronic devices of the invention.

Refer to FIG. 5 for another embodiment of the invention. The base 5 has a top end fastened to a third bar 7. The first bar 1 is pivotally coupled with the top end of the third bar 7 through a second hinge means 3'. The second hinge means 3' has a second axle 31' pivotally coupled on one end of the first bar 1. The third bar 7 is fastened to the periphery surface of the second axle 31' so that the third bar 7 can be swiveled relative to the first bar 1 through the second axle 31'. The handle 41 has a hinge portion 41a on the bottom end running through the first bar 1 and fastened to the cam 42 in the housing space 11. The cam 42 has a first protrusive portion 42a and a second protrusive portion 42b on two opposite sides formed respectively in a selected surface profile. The housing space 11 has one end leading to where the first bar 1 being coupled with the axle 31, and another end leading to where the first bar 1 being coupled with the second axle 31'. The housing space 11 further has a first brake element 43 and a second brake element 43' slidable on two ends, and a first spring 44 and a second spring 44' anchoring on the two ends. The first and second springs 44 and 44' make respectively the brake elements 43 and 43' in contact tightly with protrusive portions 42a and 42b of the cam 42 so that rotation of the cam 42 can selectively make the brake elements 43 and 43' to escape the axles 31 and 31', or slide to ram the axles 31 and 31' tightly to allow the axles 31 and 31' in a swivelable or non-swivelable condition.

When the handle 41 is moved to the first condition, the protrusive portions 42a and 42b of the cam 42 ram the brake elements 43 and 43' outwards in contact tightly with the teeth surface 32 of the axle 31 so that the axle 31 is in an anchored condition, and the first bar 1 and the second bar 2 are in a non-swivelable condition relative to each other. Meanwhile the second brake element 43' is in contact tightly with the second teeth surface 32' to anchor the second axle 31'. The first bar 1 and the third bar 7 can also be selectively set to a non-swivelable condition. When the handle 41 is moved to the second condition, the protrusive portions 42a and 42a of the cam 42 are released from the brake elements 43 and 43', and the brake elements 43 and 43' are pushed inwards respectively by the springs 44 and 44' inwards so that the first brake element 43 escapes the teeth surfaces 32 of the axle 31, and the first bar 1 and the second bar 2 can be selectively set in a swivelable condition relative to each other. Meanwhile the second brake element 43' is moved away from the second teeth surface 32' of the second axle 31', and the first bar 1 and the third bar 7 can be selectively set in a swivelable condition relative to each other.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An anchor structure for electronic devices, comprising:
  a first bar which has a housing space formed in a portion of the interior thereof;
  a second bar;
  a third bar;
  a first hinge means which includes a first axle pivotally coupled on one end of the first bar, the second bar being fastened to the peripheral surface of the first axle so that the second bar is swivelable relative to the first bar through the first axle;
  a second hinge means which includes a second axle pivotally coupled on other end of the first bar, the third bar being fastened to the peripheral surface of the second axle so that the third bar is swivelable relative to the first bar through the second axle; and
  a fastening means having a handle which has a hinge portion on a bottom end to run through the first bar and fasten to a cam in the housing space, the cam having a first protrusive portion and a second protrusive portion on two opposite sides to form respectively a selected surface profile, the housing space holding a first brake element and a second element that are slidable and corresponding respectively to the first axle and the second axle such that turning of the cam selectively moves the first brake element and the second brake element to positions to escape the first axle and the second axle or to other positions to form a tight contact with the first axle and the second axle.

2. The anchor structure of claim 1, wherein the housing space holds a first spring and a second spring corresponding respectively to the first brake element and the second brake element to force the brake element and the second brake element to form respectively a tight contact with the first protrusive portion and the second protrusive portion of the cam.

3. The anchor structure of claim 1, wherein the first axle peripheral surface and the second axle peripheral surface are formed respectively with a teeth surface.

4. The anchor structure of claim 1, wherein the brake elements have one end surface made from rubber to be in contact with the first axle and the second axle.

5. The anchor structure of claim 1, wherein the first hinge means has a first damping wheel and a second damping wheel on where the first bar being coupled with the first axle and the second axle, the first damping wheel having a portion of elements fastened to the first bar and other portion of the elements fastened to the first axle, and the second damping wheel having a portion of elements fastened to the first bar and other portion of the elements fastened to the second axle to provide a damping resistance.

6. The anchor structure of claim 1, wherein the second bar has a holding dock on other end to hold an electronic device.

7. The anchor structure of claim 1, wherein the anchor structure is mounted onto the surface of an object through the third bar.

8. The anchor structure of claim 1, wherein the third bar has other end fastened to a base to mount the anchor structure onto the surface of an object.

* * * * *